Figure 1:
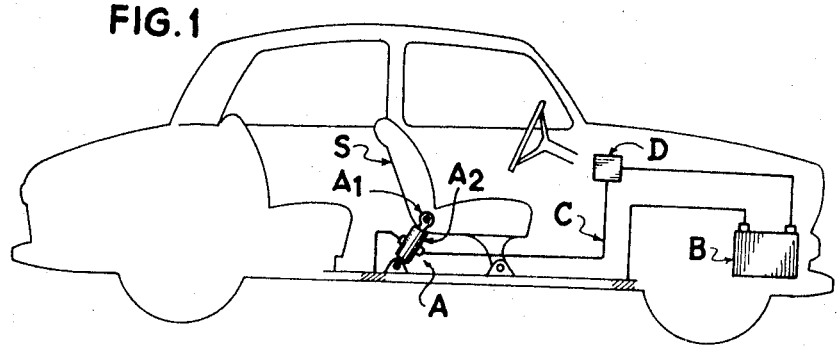

United States Patent
Mauron

[15] 3,649,786
[45] Mar. 14, 1972

[54] SAFETY SWITCH AND SYSTEM FOR A VEHICLE

[72] Inventor: Gerard Mauron, Le Pecq, France

[73] Assignees: Automobiles Peugeot, Paris; Regie Nationale des Usines Renault, Billancourt, France

[22] Filed: Oct. 13, 1969

[21] Appl. No.: 865,920

[30] Foreign Application Priority Data

Oct. 30, 1968 France .................................. 171900

[52] U.S. Cl. ............................................ 200/61.53, 180/103
[51] Int. Cl. .................................. H01h 35/14, B60r 21/02
[58] Field of Search ...................... 180/103, 82; 280/150 AB; 200/61.45, 61.53

[56] References Cited

UNITED STATES PATENTS

| | | | |
|---|---|---|---|
| 1,845,848 | 2/1932 | Richards | 180/82 UX |
| 2,868,309 | 1/1959 | Burgess | 180/103 |
| 2,971,566 | 2/1961 | Negroni | 188/1 C X |
| 3,026,972 | 3/1962 | Hendry et al | 188/1 C |
| 3,380,557 | 4/1968 | Peterson | 188/1 C |
| 3,457,382 | 7/1969 | Boswell | 200/61.45 |
| 3,493,701 | 2/1970 | Clarke | 200/61.45 |

FOREIGN PATENTS OR APPLICATIONS

| | | | |
|---|---|---|---|
| 1,364,728 | 5/1964 | France | 280/150 SB |

Primary Examiner—Benjamin Hersh
Assistant Examiner—John P. Silverstrim
Attorney—Burns, Doane, Swecker & Mathis

[57] ABSTRACT

A switching device in which the movable member of the switch actuating means is shifted by a moving element of an energy-absorbing device upon operation of the latter.

6 Claims, 3 Drawing Figures

SAFETY SWITCH AND SYSTEM FOR A VEHICLE

The present invention relates to devices for improving the safety of the passengers in a vehicle and in particular in an automobile vehicle.

Energy-absorbing devices are known which are for example incorporated in the seats or steering column or associated with the safety belts and absorb, in the event of a violent impact or shock, a large part of the energy produced so as to attenuate the effect of the impact on the passengers. In these devices, the mechanical energy, and in particular kinetic energy, is absorbed by the production of an opposing elastic force, the energy being absorbed and dissipated in the form of heat with no restoration of energy or subsequent rebound. Most of these devices comprise two elements between which are interposed the energy-absorbing means proper, each of these elements being connected to a part of the vehicle and being relatively movable upon impact.

The object of the invention is to employ such an energy-absorbing device for an auxiliary function which still further increases the safety of the passengers of the vehicle.

The invention provides a switching or circuit-breaking device comprising actuating means constituted by an element of an energy-absorbing device.

According to one embodiment of the invention, the energy-absorbing means comprise two elements mounted telescopically one inside the other, and an electric conductor extending transversely of said element and fixed at its ends to the outer element so that a movement between the two elements breaks said conductor and opens the switch which is normally closed.

In another embodiment, one of the elements of the energy-absorbing means is conductive and constitutes a contact plug of a normally open switch the closing of which is produced when there is a relative displacement between the elements.

The invention also provides a safety system for a vehicle comprising a switch such as that described hereinbefore, connected in a safety circuit of the vehicle.

In this way, in such a system the energy-absorbing means not only absorbs a large part of the energy produced in the course of a shock without restoration of this energy, which is its normal function, but it also produces one or several secondary effects which are very important such as for example, it:

Cuts off the ignition of the engine.
Cuts off the battery.
Causes injection into the fuel tank of a foam of plastics material constituting a sponge.
Sets off a fire extinguisher.
Releases a danger signal.
Instantaneously causes inflation of protective bags in front of the users.

Further features and advantages of the invention will be apparent from the ensuing description with reference to the accompanying drawing.

Figure 2:
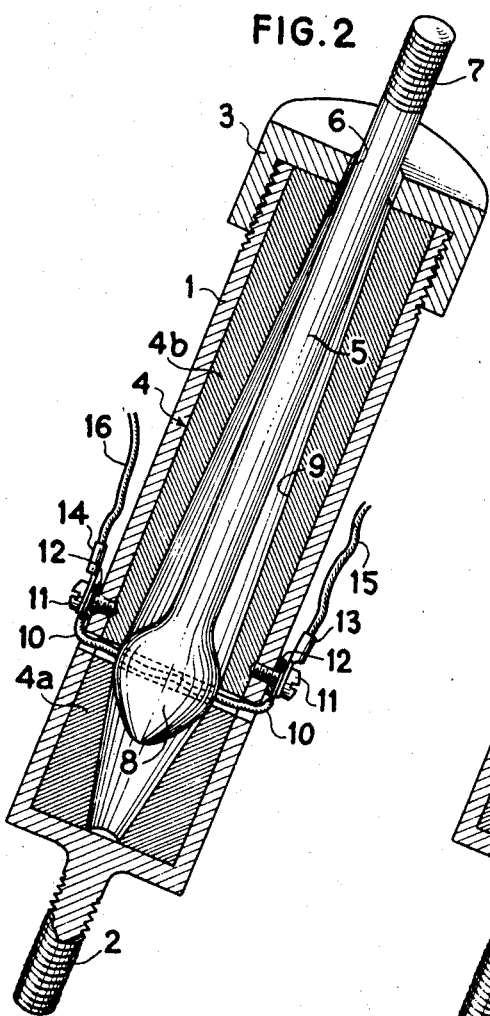
Figure 3:
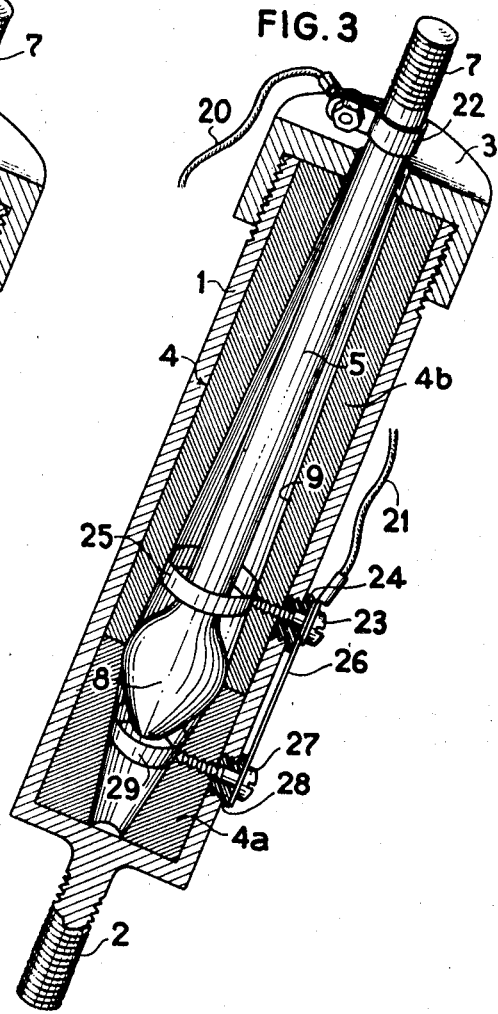

In the drawing:

FIG. 1 is a diagrammatic view of a safety system according to the invention employed on a road vehicle, and FIGS. 2 and 3 are perspective and longitudinal sectional views of two embodiments of a switch according to the invention.

Shown in FIG. 1 is a vehicle comprising a seat S equipped with at least one energy absorbing device A. The latter comprises two elements $A_1$, $A_2$ which are telescopically assembled and between which is interposed suitable energy absorbing means.

Such an energy absorbing device is employed as a switch in a circuit C, which comprises the battery B of the vehicle and the device D which can be a safety device of any kind some examples of which will be given hereinafter.

The energy absorbing device can be of any suitable type and in particular that described in U.S. application, Ser. No. 802,033, filed by the applicant on Feb. 25, 1969 now U.S. Pat. No. 3,583,530.

Briefly, such a device mainly comprises (FIGS. 2 and 3):

on one hand, a body 1 having at one end fixing means such as a screw-threaded end member 2, and at its other end a screw-threaded closing plug 3, the interior of the body being provided with a sleeve 4a, 4b of an elastically yieldable material such as an elastomer and in particular polyurethane, on the other hand, a rod 5 extending into the body by way of an aperture 6 in the plug 3 and provided externally with fixing means such as a screw thread 7 and terminated internally in a biconical enlarged head 8 or block.

The center aperture or passage 9 formed in the sleeve 4a, 4b has a diameter which decreases from the initial position of the head 8 and on each side of the latter so that the energy-absorbing device can operate in both directions, the travel of the head 8 being greater in the direction corresponding to its movement upon impact on the front part of the vehicle.

In order to constitute a switch, the energy-absorbing device is modified in the following manner. A metal wire 10 which is insulated in its major part transversely extends across the body 1 of the energy-absorbing device by for example passing through the center of the head 8. The wire 10 is bare at its ends and secured to the body 1 by means of screws 11 which are preferably of insulating plastics material with interposition of an insulating washer 12 so as to electrically insulate the wire from the body 1.

Under each of the screwheads is also clamped a terminal member 13 or 14 fixed to the end of a conductor 15 or 16. One of these conductors is connected through the device D to one of the terminals of the battery B and the other is connected to the frame of the vehicle to which the other terminal of the battery is also connected.

It will be clear that the wire 10 normally ensures the electrical connection between the conductors 15 and 16 which are part of the electric circuit C. The energy-absorbing device constitutes in the embodiment shown in FIG. 2 a normally closed switch.

Upon operation of the energy-absorbing device subsequent to impact, the displacement of the head 8 in the sleeve 4a or 4b results both in the absorption of energy—which is the main function of the device—and the shearing or breaking of the wire 10 and thus the opening of the electric circuit C between the conductors 15 and 16.

The device D can represent, for example, the ignition switch of the engine and/or of the battery circuit.

FIG. 3 shows an energy-absorbing device of the same type as that shown in FIG. 2 but which has been modified so as to be employed as a normally open switch, this switch being, for example, inserted in an electric circuit between the conductors 20 and 21.

The conductor 20 is electrically connected to the rod 5 through a collar 22. The conductor 21 is fixed to the side of the body 1 by a metal screw 23 which is engaged in an insulating ring 24 and extends through the elastically yieldable sleeve 4b to a metal ring 25 placed internally in the center aperture or passage 9 at a distance from the head 8. This ring 25 can be, for example, moulded in the sleeve 4b, the inner face of the ring being bare.

The conductor 21 is also electrically connected by a connection 26 to a second screw 27 which is engaged in an insulating ring 28 and extends through the sleeve 4a to a second metal ring 29 disposed internally in the center aperture or passage 9 on the other side of the head 8.

It will be clear that, in normal operation, the circuit is open between the conductors 20 and 21 since there is no contact between the head 8 and either of the rings 25 or 29.

On the other hand, in the event of operation of the energy-absorbing device subsequent to a shock or impact, the displacement of the head 8 in either direction results in a contact, which is at least momentary, between the head 8 and either of the rings 25 or 29 which closes the electric circuit between the conductors 20 and 21.

The closure of this circuit can be employed for controlling, directly or through a relay, any known means for limiting the harmful consequences for the users of shock or impact on the vehicle. The device D can thus be for example:

An ignition switch and/or battery circuit switch.

A device for injecting into the fuel tank a foam of plastics material constituting a sponge.

A general or localized fire extinguisher.

A danger signal.

A device adapted to instantaneously inflate protective bags in front of the passengers.

The invention has been shown to be combined with an energy-absorbing device incorporated in a seat support device, but it must be understood that the invention is not intended to be limited to this application. The energy-absorbing device modified to act as a switch (normally closed or normally open) could also be incorporated in a steering column or bumper or associated with a safety belt or strap or with any other part of the vehicle.

Further, in the case where the energy-absorbing device operates only in one direction, that is, under tension (safety strap) or under compression (bumper), the assembly shown in FIG. 3 has of course only a single ring 25 or 29 placed on the side of the head 8 to which the latter moves upon impact on the vehicle.

It is also possible to combine in the same energy-absorbing device the arrangements shown in FIGS. 2 and 3 so as to produce simultaneously the closing of a first electric circuit and the opening of a second circuit.

Although specific embodiments of the invention have been described, many modifications and changes may be made therein without departing from the scope of the invention.

Having now described my invention what I claim and desire to secure by Letters Patent is:

1. The combination of electrical switch means for connection to an electrical circuit and a kinetic energy-absorbing device, said switch means having a movable switch actuating member, said device comprising means defining an outer longitudinal element and means defining an inner longitudinal element, said outer element comprising an outer body and an inner sleeve of yieldable material fixed within said body and having a longitudinal passage, said inner element comprising a rod having an enlarged head capable of moving longitudinally through said passage while deforming said sleeve and thus absorbing energy, said switch means being incorporated in said device, one of said elements comprising said movable switch actuating member and said switch means being actuatable in response to movement of said one element a predetermined distance longitudinally of the other of said elements.

2. The combination as claimed in claim 1, comprising means defining substantially aligned transversely extending apertures in said elements, an electric conductor extending through said apertures, said conductor having two end portions which are fixed to said outer element and insulated from each other so that a relative displacement between said two elements breaks said conductor and opens said switch means which is of a normally-closed type.

3. The combination as claimed in claim 2, wherein said apertures extend transversally through said body, said sleeve and said rod and said conductor end portions are combined with terminals outside said body.

4. The combination as claimed in claim 1, wherein one of said elements is a conductor and constitutes a first contact of a normally open switch means, the other of said elements supporting a conducting member normally spaced from said one element and constituting a second contact of said switch means, whereby the closing of said switch means is produced when there is a relative longitudinal displacement between said elements.

5. The combination as claimed in claim 1, wherein said rod is electrically conductive and constitutes a first contact member of the switch means, the switch means having a second contact member mounted in said passage of said sleeve in such position as to be normally in longitudinally spaced relation to said enlarged head but capable of being contacted by said head when said rod longitudinally moves in said passage upon operation of said energy-absorbing device.

6. The combination as claimed in claim 5, further comprising a third contact member mounted in said passage of said sleeve on the opposite side of said enlarged head relative to said second contact member, said third contact member being normally in longitudinally spaced relation to said head but capable of being contacted by said head when said rod moves toward said third contact member in said passage upon operation of said energy-absorbing device.

* * * * *